US006962089B2

(12) United States Patent
Attinger

(10) Patent No.: US 6,962,089 B2
(45) Date of Patent: Nov. 8, 2005

(54) DEVICE FOR MONITORING CABLES OF A LIFT

(75) Inventor: Adrian Attinger, Unterägeri (CH)

(73) Assignee: Inventio AG, Hergiswil (CH)

( * ) Notice: Subject to any disclaimer, the term of this patent is extended or adjusted under 35 U.S.C. 154(b) by 92 days.

(21) Appl. No.: 10/761,610

(22) Filed: Jan. 21, 2004

(65) Prior Publication Data

US 2004/0149048 A1 Aug. 5, 2004

(30) Foreign Application Priority Data

Jan. 29, 2003 (EP) .................................. 03405041

(51) Int. Cl.[7] .................................................. G01L 1/26
(52) U.S. Cl. .................................................. 73/862.393
(58) Field of Search .................... 73/862.391, 862.451, 73/862.392, 862.393, 862.541

(56) References Cited

U.S. PATENT DOCUMENTS 3,580,294 A * 5/1971 Muller ........................ 139/371
3,704,017 A * 11/1972 Young ......................... 473/482
4,106,594 A 8/1978 Kirsch et al.
4,605,189 A * 8/1986 Bruneau .................. 248/162.1
5,937,973 A 8/1999 Liebetrau
5,960,849 A * 10/1999 Delaney et al. ............. 160/188
6,421,962 B2 * 7/2002 McNamara .................... 52/64

FOREIGN PATENT DOCUMENTS

JP 01043482 A 2/1989
JP 11 171425 A 6/1994
JP 06 345352 A 12/1994
JP 08198545 A 8/1996
JP 10236747 A 9/1998
JP 11 343082 A 12/1999
JP 2000-103577 A 4/2000
SU 1 255540 A2 9/1986

* cited by examiner

*Primary Examiner*—Max Noori
(74) *Attorney, Agent, or Firm*—Schweitzer Cornman Gross & Bondell LLP

(57) ABSTRACT

A cable slackness monitoring device has a pull cord to detect movement of support pins associated with the cables. In the case of a slack cable the support pin moves downwardly relative to a carrier frame. Fixedly clamped between a nut and a locknut is a trigger element which engages the pull cord in the case of movement of the support pin. The pull cord is fixed at one end to a fixing point of a bracket, and is, and is connected at the other end to a displaceable slide. The deflection of the taut pull cord caused by the movement of the support pin moves the slide, actuating a limit value detection.

7 Claims, 5 Drawing Sheets

Fig. 4.1

DEVICE FOR MONITORING CABLES OF A LIFT

The invention relates to a device for monitoring cables of a lift which are connected to a carrier frame of a lift cage by means of a cable end connection and an apertured plate, wherein a respective support pin is provided for each cable for fixing the apertured plate, the movement of the support pin in the case of slack cable being able to be monitored by means of a sensor.

BACKGROUND OF THE INVENTION

A monitoring device for support cables of a lift platform has become known from the specification JP 06345352. An end of each support cable is provided with a cable eye stiffener at which a support pin is arranged. An end member is provided at the free end of the support pin, and a compression spring is arranged between a carrier frame and the end member. In the case of slack in the support cable the spring moves the support pin, together with the end member, downwardly relative to the carrier frame. The movement of the end member is monitored by means of limit switches and a warning is generated.

A disadvantage of the known device resides in the fact that the monitoring of each support cable is costly. Moreover, the end members of the support pins lie closely adjacent to one another, whereby arrangement of the limit switches is made difficult.

It is accordingly a purpose of the present invention to provide a remedy to the shortcomings of the prior art.

BRIEF DESCRIPTION OF THE INVENTION

The invention meets the objective of avoiding the disadvantages of the known device and of creating a device for monitoring slack cables which ensures the safety of lift passengers by simple means, and comprises the incorporation of a pull cord which monitors the movement of the cable support pins. In a slack cable condition, the support pin causes the pull cord to be displaced, which in turn activates a sensor.

The pull cord can be associated with the support pins by trigger elements. The trigger elements may be mounted to the support pins, and may comprise a tab having a base through which the pull cord passes. The trigger element may further be spring biased.

The advantages achieved by the invention are essentially to be seen in that the monitoring device is suitable for every form of arrangement of the support pins or for every hole pattern of the apertured plate serving as connecting element between carrier frame and support pin. Only one sensor is necessary for monitoring all support pins. Moreover, the monitoring device according to the invention is independent of the number of support pins to be monitored and independent of the geometry of the apertured plate. The monitoring device is light and able to be retrofitted without great cost, has little sensitivity to acceleration/retardation (false triggering) and has low assembly and mounting costs.

BRIEF DESCRIPTION OF THE DRAWINGS

The present invention is explained in more detail by reference to the accompanying figures, in which.

DETAILED DESCRIPTION OF THE INVENTION

Figure 1:
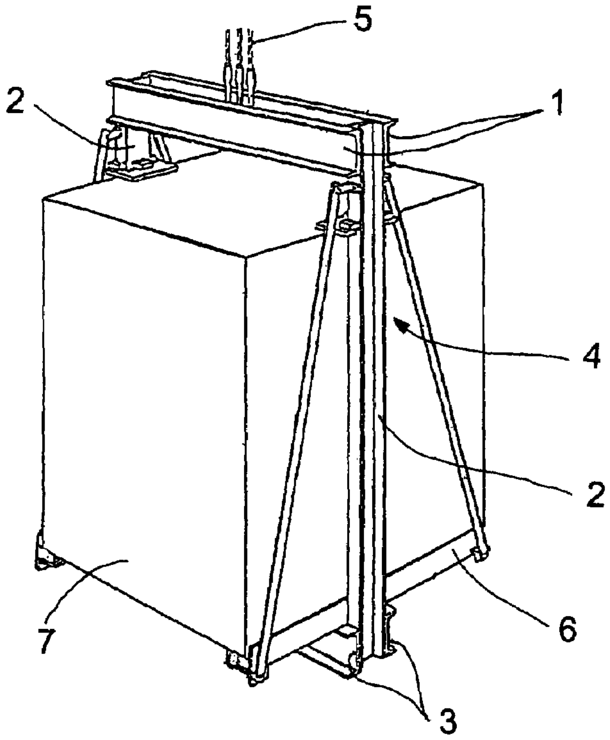
FIG. 1 is a perspective view of a carrier frame with a lift cage with which the invention is employed.

In FIG. 1 an upper yoke is denoted by 1, which together with vertically extending beams 2 and a lower yoke 3 form a carrier frame which is suspended by a cable train consisting of support cables 5 and is movable in a lift shaft (not illustrated) along guide rails (not illustrated). In FIG. 1 the cable train comprises three cables. The number of cables 5 in the cable train is dependent on the cage weight, on the nominal load and on the cable cross-section that is used. A base frame 6 seated on the lower yoke 3 carries a lift cage 7 provided for vertical transport of persons and goods.

Figure 2:
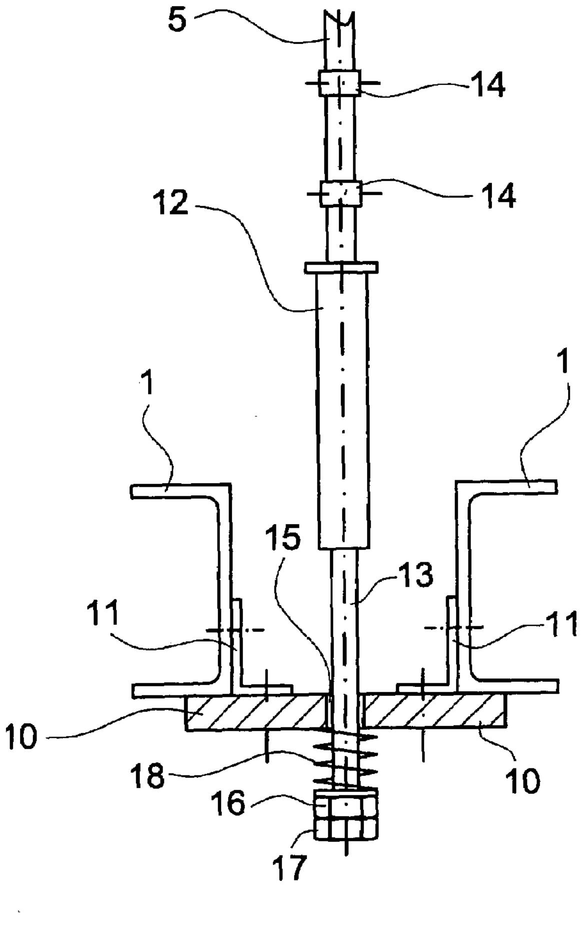
FIG. 2 shows an upper carrier frame yoke with an apertured plate and support pin, in accordance with the invention.

FIG. 2 shows the upper support frame yoke 1, at which an apertured plate 10 is arranged by means of brackets 11. The apertured plate 10 thus supports the carrier frame 4. A respective cable eye stiffener 12, with which a support pin 13 engages, is provided as a cable end connection for each cable 5. The cable 5 forms a loop in the cable eye stiffener 12, wherein the cable end is fixed to the cable 5 by means of cable clamps 14. The apertured plate 10 has a respective bore 15 for each support pin 13, wherein the support pin 13 penetrates the bore 15 and protrudes below the apertured plate 10. The support pin 13 has a thread at its lower end with a nut 16 which is secured by means of a locknut 17. A compression spring 18 (for example at least one helical spring or at least one plate spring) is arranged between the nut 16 and the apertured plate 10. In the case of a slack cable 5 the compression spring 18 moves the support pin 13 downwardly relative to the carrier frame, wherein the movement P1 of the support pin 13 is detected by means of the monitoring device according to the invention.

Figure 3:
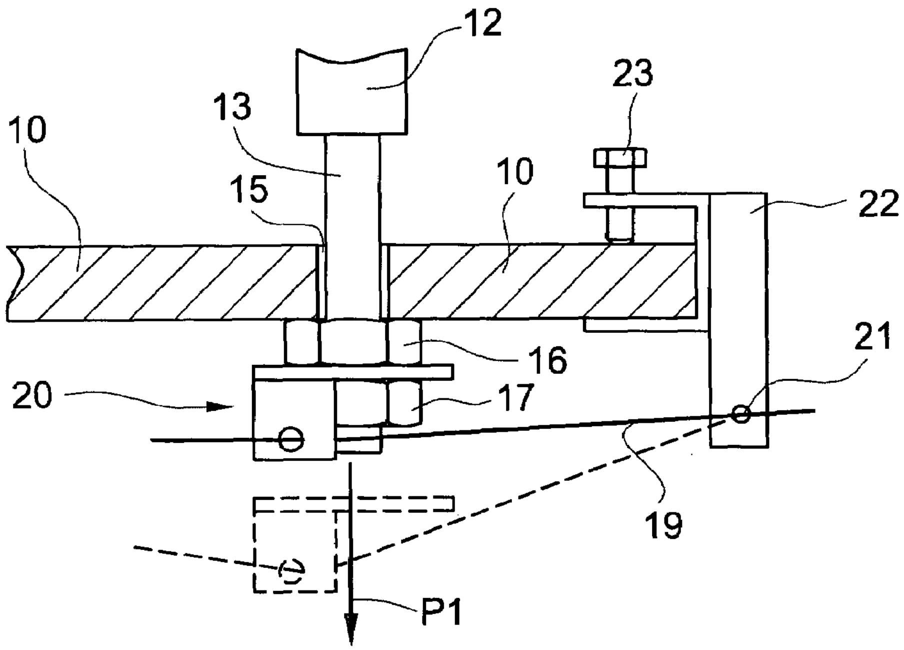
FIG. 3 shows a first embodiment of the monitoring device.
Figure 3A:
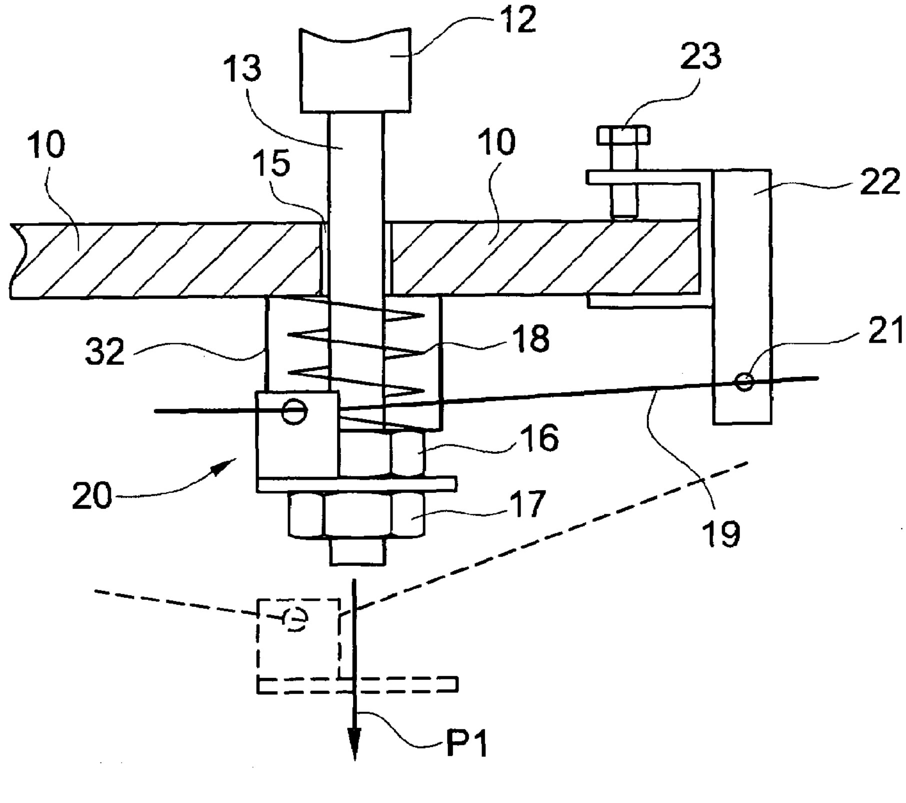
FIG. 3*a* shows a second embodiment of the monitoring device.
Figure 3B:
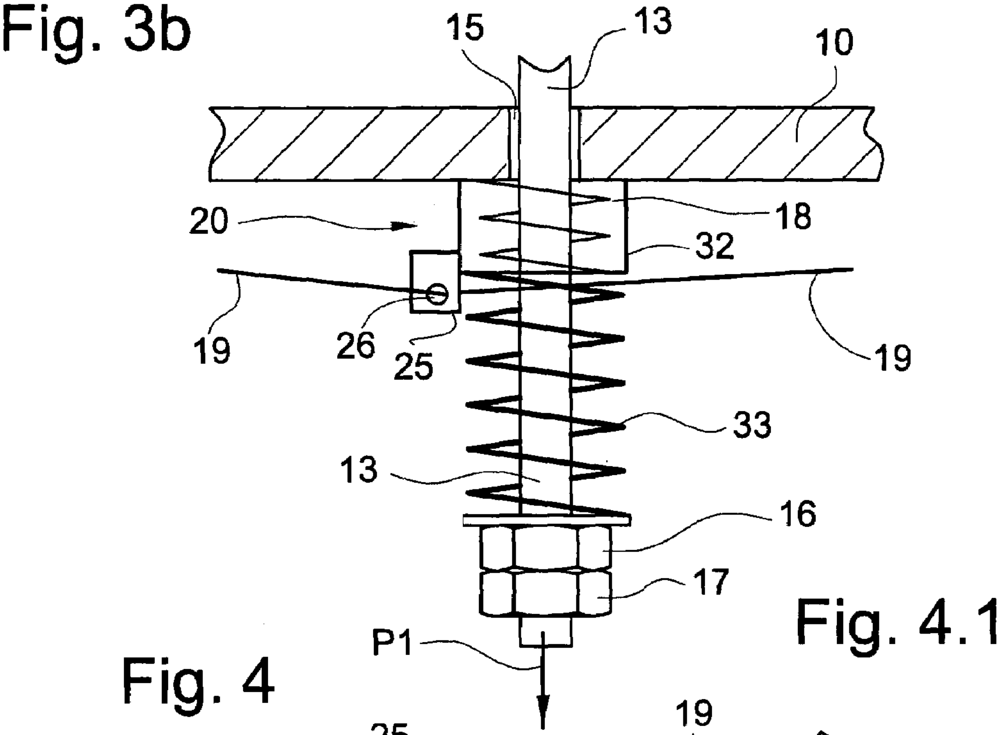
FIG. 3*b* shows a third embodiment of the monitoring device.

FIG. 3, FIG. 3*a* and FIG. 3*b* show alternative constructions of the monitoring device according to the invention with pull cord 19 for a support cable 5. In each embodiment a slack cable 5 causes the support pin 13 to move downwardly relative to the carrier frame as symbolized by the arrow P1. Fixedly clamped between the nut 16 and the locknut 17 is a trigger element 20 which entrains the taut pull cord 19 with the movement P1 of the support pin 13. The pull cord 19 is fixed at one end to a fixing point 21 of a bracket 22. The bracket 22 is fixedly clamped to the apertured plate 10 by means of screws 23. A clip connection can also be provided instead of the screw.

FIG. 3 illustrates a construction where the weight of the slack cable 5 alone is sufficient to cause the support pin to drop and deflect the pull cord 19. In the embodiment of FIG. 3*a*, an angled support 32 is mounted upon the pin 13 above nut 16 with its upper edge bearing against apertured plate 10.

A compression spring 18 is arranged between the apertured plate and the base of support 32. In the case of a slack cable 5 the compression spring 18 moves the support 32 and thus the support pin 13 downwardly relative to the carrier frame, wherein the movement P1 of the support pin 13 is detected by means of the monitoring device according to the invention.

Figure 7:
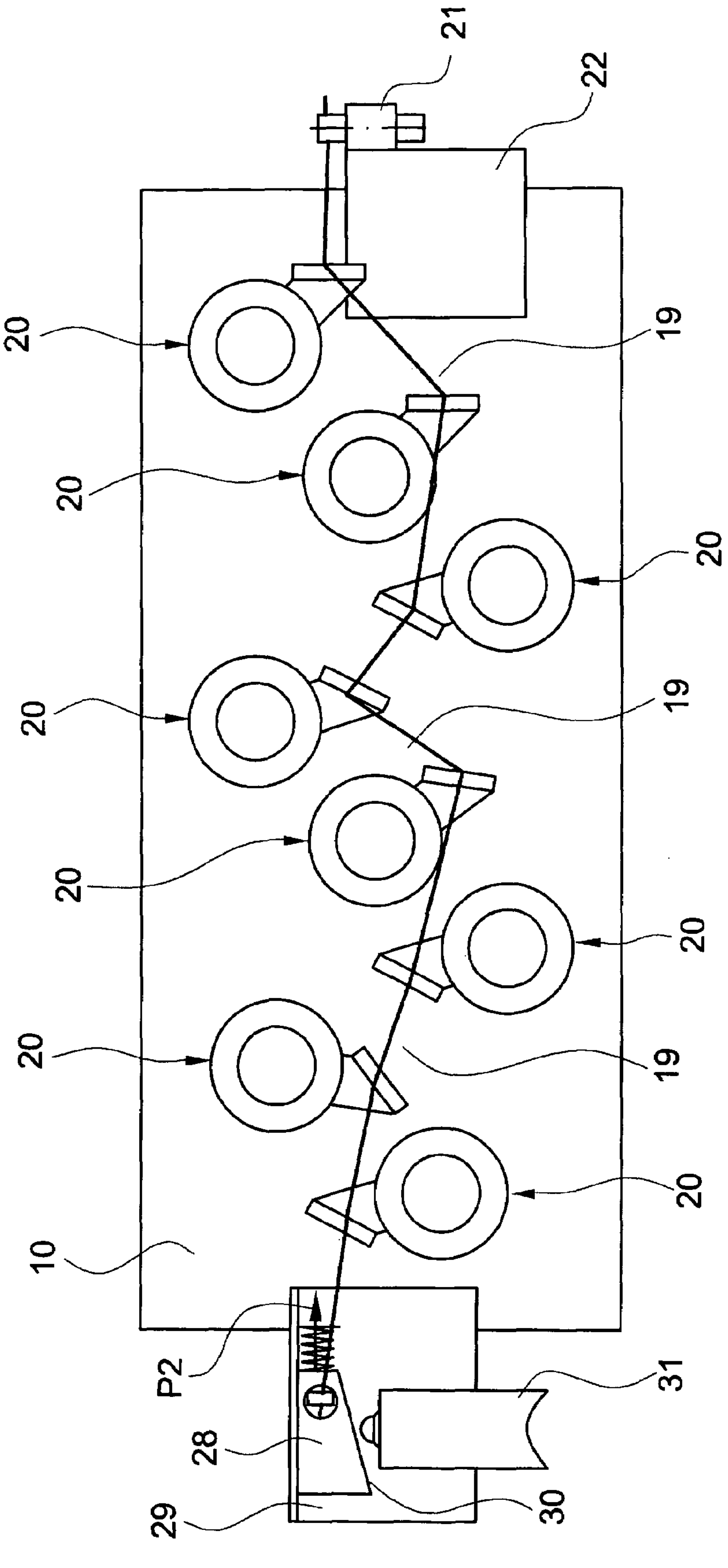
FIG. 7 shows the monitoring device with a pull cord in the case of a scattered arrangement of the support pins.

The deflection of the pull cord 19 caused by the movement P1 of the support pin 13 is illustrated by a dashed line. A sensor or a limit value detector 31 is actuated by the deflection of the pull cord 19, as illustrated in FIG. 7.

As shown in FIG. 3*b*, a compression spring 33 which is substantially stronger in comparison with the compression spring 18 can be provided to compensate for cable tension differences. The compression spring 33 is positioned between the support 32 and nut 16. The support has a tab 25 with bore 26, which serves as trigger element 20, wherein the pull cord 19 is guided through the bore. If the compression spring 33 relaxes due to cable stretching, the support pin 13 is able to move downwardly without deflecting the pull cord 19, as spring 18 remains compressed. In the case of slack cable 5, greater elongation is accommodated by both springs, the compression spring 18 moving the support 32 and thus the support pin 13 downwardly relative to the carrier frame, wherein the movement P1 of the support pin 13 is detected by means of the pull cord 19.

Figure 4:
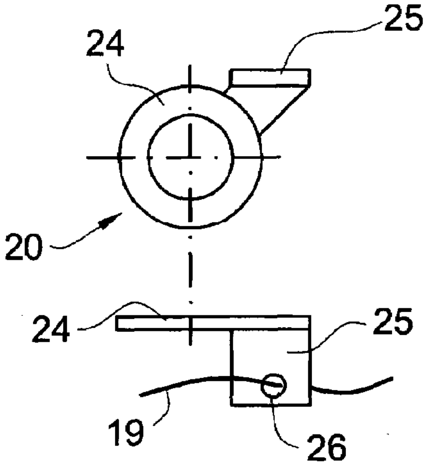
FIGS. 4 and 4.1 are plan and elevation views showing details of alternative trigger elements for the pull cord.
Figure 4:
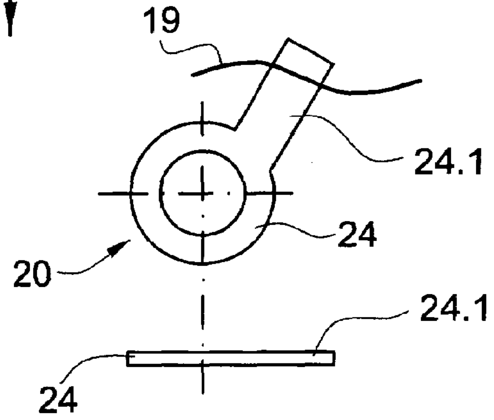

FIG. 4 shows details of a trigger element 20 for the pull cord 19 as depicted in FIGS. 3 and 3*a*. The trigger element 20 substantially consists of a washer 24, at which a tab 25 with bore 26 is arranged. The pull cord 19 is drawn through the bore 26.

FIG. 4.1 shows an alternative embodiment of the trigger element 20. An arm 24.1 is arranged at the washer 24 instead of the tab 25. The arm 24.1 deflects the pull cord 19 in the case of a slack cable 5.

Figure 5:
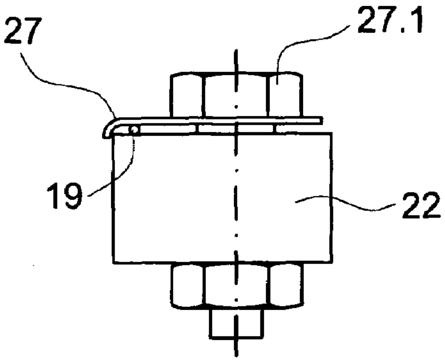
FIGS. 5 and 6 are side and front elevation views, showing details of the fastening of the pull cord end.
Figure 6:
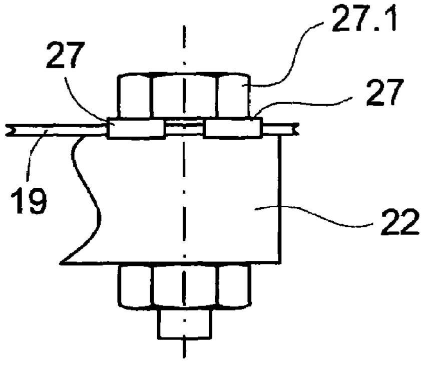

FIG. 5 and FIG. 6 are side and front views, showing details of the fastening of a pull cord end at the fixing point 21. The end of the pull cord 19 is fixedly clamped by means of shackle 27 and bolt 27.1 to the bracket 22.

FIG. 7 shows the monitoring device with pull cord 19 in the case of an apertured plate 10 with a scattered arrangement of the support pins 13. The apertured plate 10 is shown as seen from below. The other end of the pull cord 19 is arranged at a slide 28 which is guided in a housing 29. The housing 29 is fixed to the apertured plate 10 by means of brackets. With the deflection of the pull cord 19 the slide 28 is set into movement as symbolized by the arrow P2, wherein the slide 28 actuates, by means of its control chamfer 30, a limit value detector 31, which may be in the form of a switch.

When the deflection of the pull cord 19 is eliminated by readjustment of the tripped support pin 13 by means of the nuts 16, 17, the spring-loaded slide 28 automatically moves back into its starting position. The monitoring device according to the invention is operationally ready again.

Figure 8:
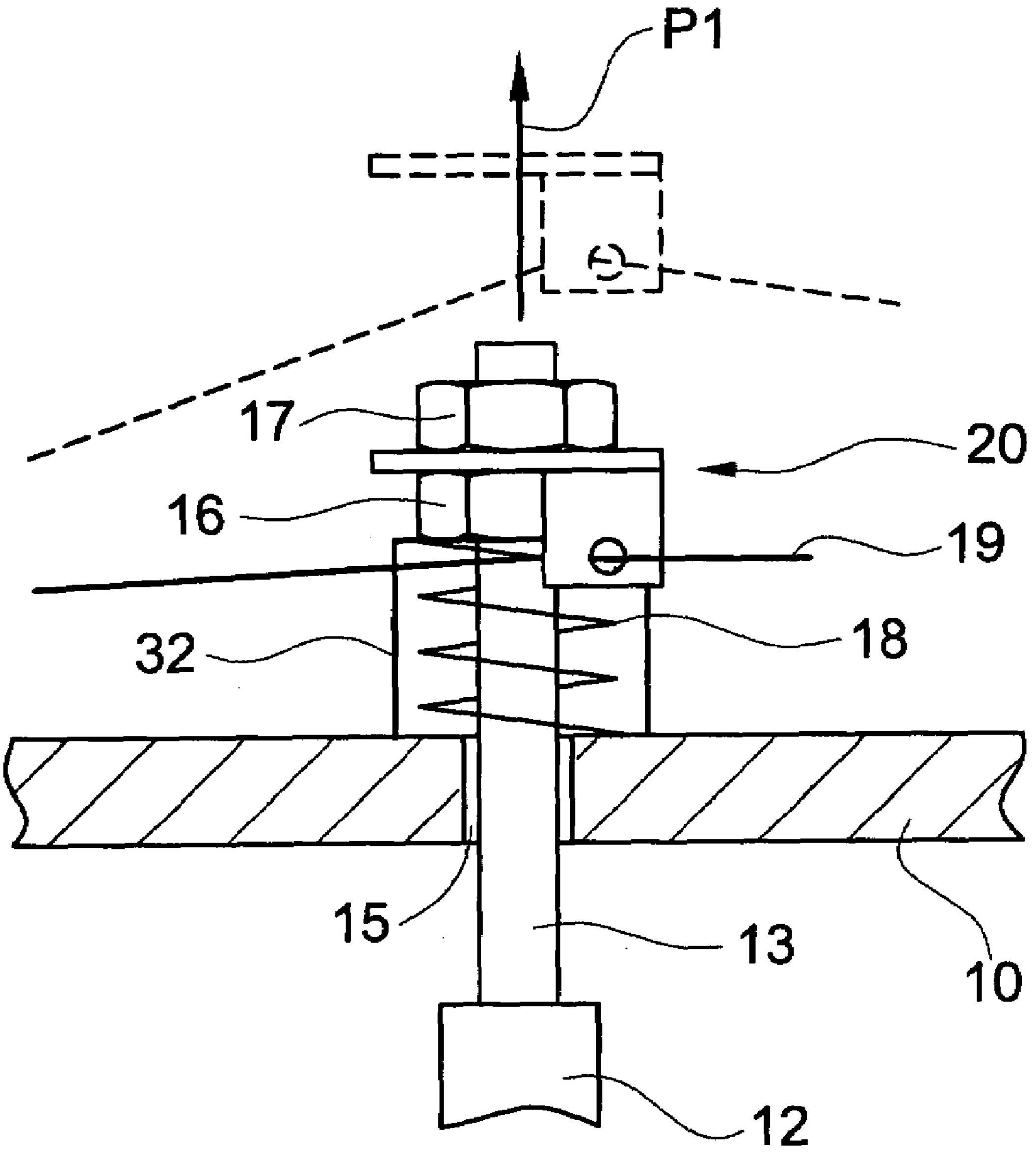
FIG. 8 shows a monitoring device with a pull cord for a compensating cable.

FIG. 8 shows the mode of function of the monitoring device according to the invention with pull cord 19 in conjunction with a compensating cable, also called a balance cable, which is likewise provided with a cable eye stiffener 12 and support pin 13. The apertured plate 10 is arranged at the lower carrier frame yoke 3. Construction, fastening and mode of functioning of the cable end connection and the monitoring device are comparable with the device according to FIG. 3, FIG. 3*a* and FIG. 3*b*.

The monitoring device according to the invention can also be arranged at the counterweight side.

I claim:

1. A device for monitoring cables of a lift that are connected to a carrier frame of a lift cage by means of a cable end connection and an apertured plate wherein a respective support pin is provided for each cable for fixing to the apertured plate, movement of the pin in a slack cable condition being able to be monitored by means of a sensor, characterised in that for monitoring the movement of the support pin there is provided a pull cord which in the slack cable condition actuates the sensor.

2. The device according to claim 1, characterised in that a respective trigger element is provided for each support pin for transmitting the movement of the support pin to the pull cord.

3. The device according to claim 1 or 2, wherein the support pin is spring-loaded by a compression spring supported at the apertured plate to move the support pin in the slack cable condition.

4. The device according to claim 1 or 2, wherein the trigger element comprises a washer with a tab, and the pull cord passes through a bore arranged at the tab.

5. The device according to claim 1 or 2, wherein the trigger element comprises a washer with an arm for deflecting the pull cord in the slack cable condition.

6. The device according to claim 1 or 2, wherein the pull cord is fixed at a first end at a fixing point and is coupled at a second end to a slide, the slide having a control chamfer for actuating the sensor during slide travel as a result of pull cord deflection.

7. The device according to claim 6, further comprising a housing for movable guidance of the slide, the housing having means for automatically returning the slide to a starting position after elimination of pull cord deflection.

* * * * *